United States Patent
Ewald et al.

(10) Patent No.: US 6,390,137 B1
(45) Date of Patent: May 21, 2002

(54) CO-TUBE ASSEMBLY FOR HEATING AND AIR CONDITIONING SYSTEM

(75) Inventors: Kurt Ewald, Binbrooke; Charles Thrift, Farmington Hills; John Horst, Sterling Heights, all of MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 09/599,081

(22) Filed: Jun. 20, 2000

(51) Int. Cl.[7] .................................................. F16L 9/18
(52) U.S. Cl. .................. 138/114; 138/155; 138/DIG. 4; 285/132.1
(58) Field of Search .................. 138/114, 111, 138/155, DIG. 4, 39; 285/132.1, 133.11, 133.3, 133.6, 130.1

(56) References Cited

U.S. PATENT DOCUMENTS

| | | | | |
|---|---|---|---|---|
| 3,938,233 A | * | 2/1976 | Cannon | 138/114 |
| 4,886,305 A | * | 12/1989 | Martin | 138/113 |
| 4,998,754 A | * | 3/1991 | Matsumoto et al. | 138/177 |
| 5,076,242 A | * | 12/1991 | Parker | 138/114 |
| 5,427,419 A | * | 6/1995 | Frey et al. | 285/133.1 |
| 5,456,502 A | * | 10/1995 | Sharp | 138/114 |
| 5,931,184 A | * | 8/1999 | Armenia et al. | 138/114 |
| 6,009,908 A | * | 1/2000 | Hartnagel et al. | 138/114 |
| 6,145,545 A | * | 11/2000 | Hartnagel et al. | 138/114 |

* cited by examiner

*Primary Examiner*—James Hook
(74) *Attorney, Agent, or Firm*—Jenner & Block (57) ABSTRACT

This invention relates to a co-tube assembly for a heating and air conditioning system. The co-tube assembly comprises a connector an inner tube and an outer tube. The connector including a first opening, a second opening and a third opening. The inner tube extends through the first opening and the second opening of the connector. The inner tube has a first portion axially outwardly of the first opening of the connector and a second portion axially outwardly of the second opening of the connector. The outer tube is disposed over the first portion of said inner tube and inserted into said first opening of the connector.

18 Claims, 5 Drawing Sheets

CO-TUBE ASSEMBLY FOR HEATING AND AIR CONDITIONING SYSTEM

BACKGROUND OF THE INVENTION

The present invention relates to co-tube assemblies. More specifically, it relates to a co-tube assembly for a heating and air conditioning system of a motor vehicle.

Motor vehicles typically include a heating and air conditioning system for heating and cooling of an occupant compartment of the motor vehicle. The heating and air condition system includes a number of tubes conveying fluids and vapors from one component of the heating and air condition system to another component of the heating and air condition system. Such an example is the air conditioning system conveying liquid refrigerant from the compressor to the evaporator and then conveying gas refrigerant from the evaporator to the compressor. Because these systems generally comprise several independent tubes leading to and exiting from each component, packaging of these tubes in a vehicle can be problematic.

Furthermore, evaporation of the liquid refrigerant prior to the liquid refrigerant reaching the evaporator greatly reduces the efficiency of the air condition system. One method of preventing premature evaporation of the liquid refrigerant is to cool the liquid refrigerant while it is being carried to the evaporator.

To reduce space required for packaging the air condition system in a vehicle and to cool the liquid refrigerant while being carried to the evaporator, a co-tube assembly can be used. Such a co-tube assembly is illustrated in U.S. Pat. No. 6,009,908, which is herein incorporated by reference. A prior art co-tube comprises an inner tube and an outer tube disposed concentrically with respect to each other having one or more radially extending ribs disposed between the inner tube and the outer tube. The ribs are solidly mounted to the inner surface of the outer tube and slidably mounted to the outer surface of inner tube. The prior art co-tube is assembled by inserting the inner tube into the outer tube with ribs formed therein. The inner tube of the co-tube is adapted to carry a first fluid or vapor in a first direction, and the channels defined by the inner tube, the outer tube and the ribs carry a second fluid in an opposing direction. In using the co-tube for an air conditioning system of a vehicle, the inner tube of the co-tube carries liquid refrigerant from the compressor to the evaporator and the defined by the inner tube, the outer tube and the ribs carry the gas refrigerant from the evaporator to the compressor. Since the gas refrigerant is significantly colder than the liquid refrigerant, the gas refrigerant absorbs the heat from the liquid refrigerant and delays the evaporation of liquid refrigerant. To achieve optimal efficiency of the of the air conditioning system, evaporation of the entire content of the liquid refrigerant would need to occur in the evaporator. Therefore, not cooling the liquid refrigerant sufficiently, thus allowing the liquid refrigerant to evaporate prior to reaching the evaporator reduces the efficiency of the air condition system. Likewise, cooling the liquid refrigerant too much, thus preventing the entire content of the liquid refrigerant to evaporate in the evaporator also reduces the efficiency of the air conditioning system.

The inner and outer tubes for forming the prior art co-tube are formed of aluminum having a thin thickness. Due to the thin thickness of the aluminum tubes, connecting a co-tube to another tube by welding the tube directly to the co-tube, such as a saddle joint, is not practical. Therefore, there is a need to provide a connector adapted for joining a co-tube to a connector tube for separating the co-tube to two tubes or discharging a portion of one of the fluid or vapor.

Furthermore, since the inner tube of the prior art co-tube is made of aluminum, the only way to vary the amount heat transfer between the gas refrigerant and the liquid refrigerant is to vary the length of the co-tube. Due to the packaging requirement of the air conditioning system in a vehicle, varying the amount heat transfer between the gas refrigerant and liquid refrigerant by merely varying the length of the co-tube is not practical. Therefore, there is a need to provide a co-tube assembly which has a heat transfer rate other than the heat transfer rate of aluminum.

SUMMARY OF THE INVENTION

This invention relates to a co-tube assembly for a heating and air conditioning system. The co-tube assembly comprises a connector an inner tube and an outer tube. The connector including a first opening, a second opening and a third opening. The inner tube extends through the first opening and the second opening of the connector. The inner tube has a first portion axially outwardly of the first opening of the connector and a second portion axially outwardly of the second opening of the connector. The outer tube is disposed over the first portion of said inner tube and inserted into said first opening of the connector.

DETAILED DESCRIPTION OF THE EMBODIMENTS

The co-tube of the present invention comprises an inner tube and an outer tube disposed concentrically with respect to each other. The co-tubes and the connectors described herein can be used for the air condition system of an automobile or the heating system of an automotive. For illustrative purposes only, the various embodiments of co-tubes and connectors herein are described in reference to the air condition system. In such embodiments for use in the air conditioning system, the inner tubes carry the liquid refrigerant and the spaced defined between the inner and outer tube carry the gas refrigerant. It should be noted that the applications for the co-tubes and connectors disclosed herein are not limited to the air condition system carrying liquid and gas refrigerant. The co-tubes and connector disclosed herein can also be applied to the heating system carrying liquid and/or gas coolant.

The co-tube of the present invention can have one or more ribs disposed between the inner tube and the outer tube. The ribs are solidly mounted to the inner surface of the outer tube and slidably mounted to the outer surface of inner tube. The ribs extend longitudinally and radially inwardly and are spaced approximately equally apart. The ribs provide rigidity radial allowing the inner tube to be bent with the outer tube without forming a kink on the inner tube. The ribs also provide spacing between the inner tube and the outer tube to prevent the tubes from knocking should one of the tubes reach its natural frequency.

Alternatively, according to the present invention, a rib-less co-tube may also be utilized. For the purpose of this application, rib-less is defined as the inner tube having a cylindrical outer surface and the outer tube having a cylindrical inner surface. Since the inner tube has a cylindrical outer surface, there is no rib extending radially outward and since the outer tube has a cylindrical inner surface, there is no rib extending radially inwardly. The rib-less co-tube comprises an inner tube formed of a soft and flexible material that can not be easily deformed. Examples of such material include but are not limited to elastomeric material and polymeric material. The preferred flexible material is polyamide 6.6 for its low cost and effectiveness as barrier for refrigerant. The inner tube can be formed of a single layer of a flexible material or multi-layers of flexible materials. Since the inner tube of the co-tube can not easily deformed, ribs disposed between the outer tube and the inner tube for preventing the inner tube from developing kinks are no longer necessary. In addition, due to the flexible and soft nature of the inner tube, ribs disposed between the outer tube and the inner tube are no longer necessary for preventing knocking noises upon one of the tubes reaching its natural frequency. The inner tube of the co-tube is adapted to carry a first fluid or vapor in a first direction, and the space defined between the inner and outer tubes carries a second fluid or vapor in an opposing direction. In using the co-tube for an air conditioning system of a vehicle, the inner tube of the co-tube carries liquid refrigerant from the compressor to the evaporator and the space defined between the inner and outer tubes carries the gas refrigerant from the evaporator to the compressor.

The heat transfer rate through an elastomeric material or a polymeric material is generally lower than the heat transfer rate through aluminum. The use of an inner tube formed of an elastomeric material or a polymeric material allows for lower heat transfer than an inner tube formed of aluminum having the same length. This allows for the co-tube section of the air conditioning system of a vehicle to be longer than a co-tube section having an aluminum inner tube and still allows the liquid refrigerant to be evaporated in the evaporator.

Figure 1:
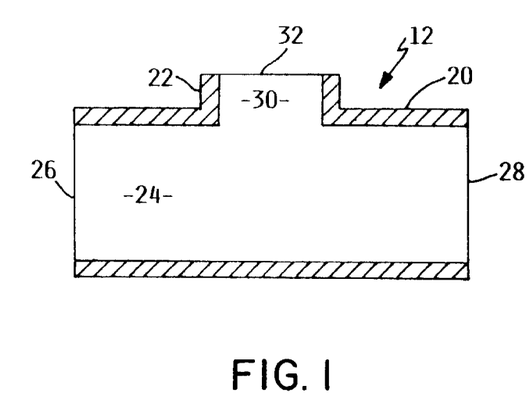
FIG. 1 is a sectional view taken through a first embodiment of a connector.
Figure 2:
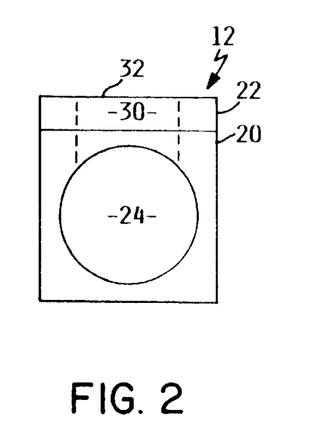
FIG. 2 is front view of the connector of FIG. 1.
Figure 3:
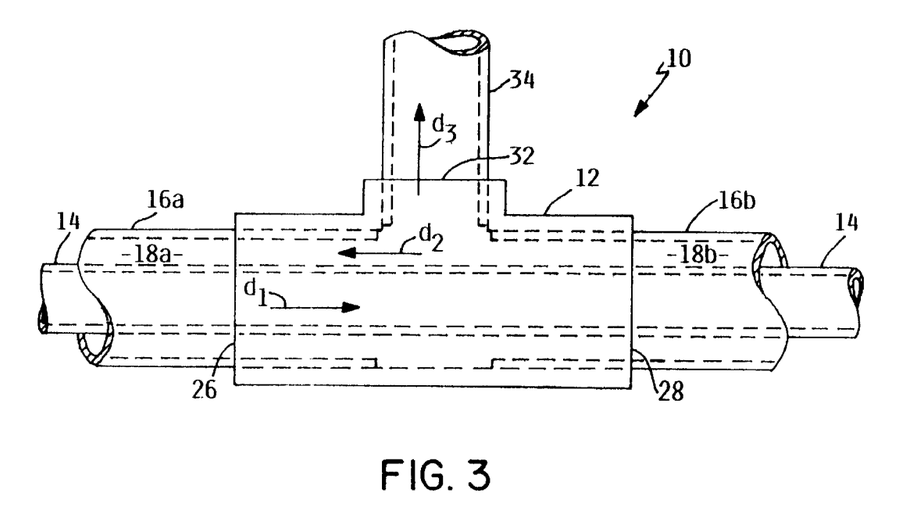
FIG. 3 is a side view of the connector of FIG. 1 as assembled with co-tube and connector tube.

A first embodiment of a connector of a co-tube assembly 10 is a breakout connector 12 located mid-line of a co-tube for discharging or receiving a portion of the gas refrigerant carried in the space 18a and 18b defined between the inner tube 14 and outer tubes 16a and 16b. FIGS. 1–3 illustrate the breakout connector 12 in accordance with the first embodiment.

The breakout connector 12 has a rectangularly shaped connector body 20 with a boss 22 extending from the top surface of the connector body 22. The breakout connector 12 defines a first bore 24 extending longitudinally along the entire length of the breakout connector 12 from a first opening 26 to a second opening 28. A portion of a first outer tube 16a is inserted into the first opening 26 and a portion of a second outer tube 16b is inserted into the second opening 28. The diameter of the first bore 24 is slightly larger than the outer diameter of the outer tubes 16a and 16b allowing a portion of the outer tubes 16a and 16b to fit tightly within the first bore 24. The breakout conductor 12 further defines a second bore 30 extending radially through the boss 22 of the breakout connector 12 and perpendicularly intersects the first bore 24. The second bore 30 extends from the first bore 24 to a third opening 32. A connector tube 34 is inserted to the third opening 32. The diameter of the second bore 30 is slightly larger than the outer diameter of the connector tube 34 allowing a portion of the connector tube 34 to fit tightly within the second bore 30.

The co-tube assembly 10 with the breakout connector 12 inserted mid-line of the co-tube is assembled as follows. One end of the first outer tube 16a is inserted into the first opening 26 of the first bore 24 and one end of the second outer tube 16b is inserted into the second opening 28 of the first bore 24. The first outer tube 16a and the second outer tube 16b are then welded or brazed to the breakout connector 12 to secure the first outer tube 16a and the second outer tube 16b to the breakout connector 12. Thereafter, the inner tube 14 is slid axially into the first outer tube 16a, the first bore 24 of the breakout connector 12 and the second outer tube 16b. The connector tube 34 is then inserted into the second bore 30 of the breakout connector 12. The connector tube 34 is then welded or brazed to the breakout connector 12 to secure the connector tube 34 to the breakout connector 12.

Instead of inserting a connector tube 34 into the second bore 30, it is also possible to insert a plug (not shown), having a radially outer diameter approximately the same as the diameter second bore 30, into the second bore 30. The plug allows the co-tube assembly with the breakout connector inserted mid-line to operate as a co-tube without a reakout connector 12, but allows for a connector tube 34 to be attached to the breakout connector 12 when necessary by removing the plug and inserting a connector tube 34 into the second bore 30.

The co-tube assembly 10 with breakout connector 12 located mid-line of a co-tube functions as follows. The inner tube 14 carries liquid refrigerant in a first direction as indicated by arrow $d_1$. Since the inner tube 14 is continuous, including the section of the inner tube 14 radially inwardly of the breakout connector 12, the breakout connector 12 does not disturb the flow of the liquid refrigerant carried within the inner tube 14. The space defined between the inner tube 14 and the first outer tube 16a, the space defined between the inner tube 14 and the first bore 24, and the space defined between the inner tube 14 and the second outer tube 16b carry gas refrigerant in an opposing direction as indicated by arrow $d_2$.

If a connector tube 34 is inserted into the second bore 30, a portion of the second fluid flows into the connector tube 34 as indicated by arrow $d_3$ and the remaining portion of the second fluid flows into the space defined between the inner tube 14 and the first outer tube 16a. If a plug is inserted into the second bore 30, the entire second fluid flows into the space between the inner tube 14 and the first outer tube 16a.

Figure 4:
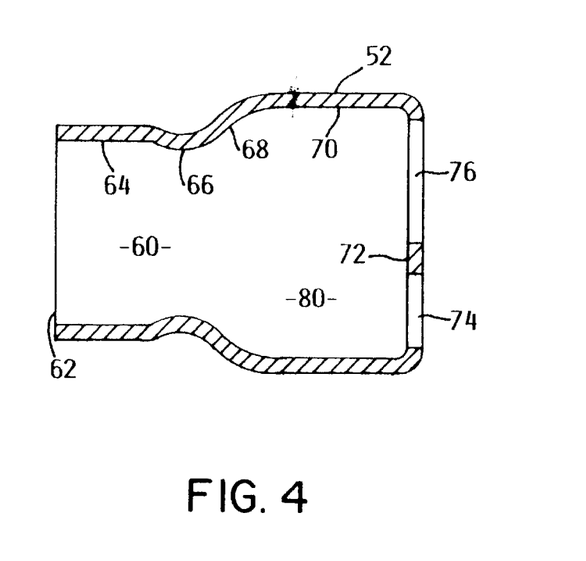
FIG. 4 is a sectional view taken through a second embodiment of a connector.
Figure 5:
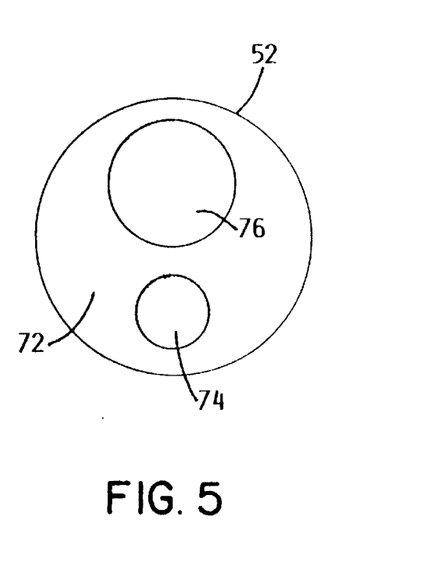
FIG. 5 is a front view of the connector of FIG. 4.
Figure 6:
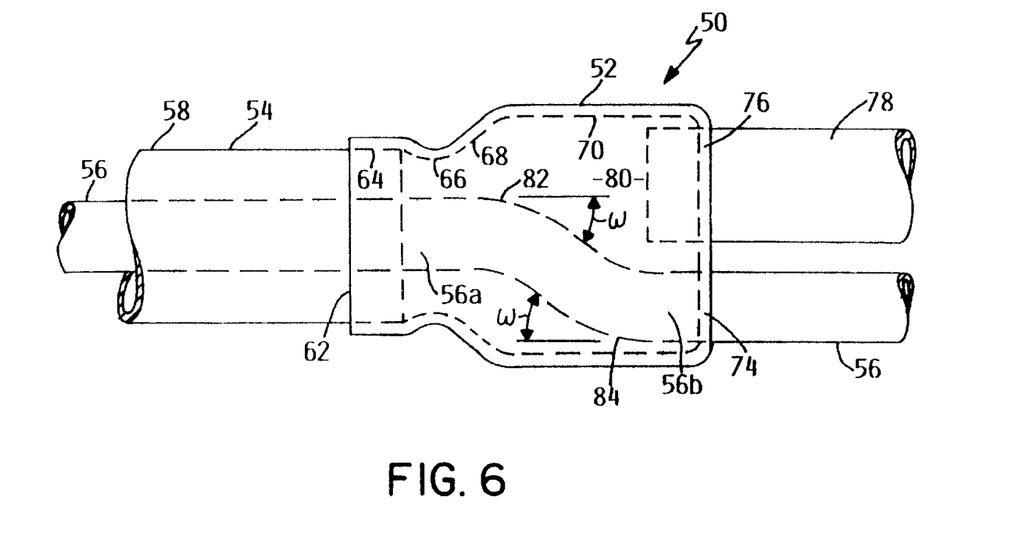
FIG. 6 is a side view of the connector of FIG. 4 as assembled with co-tube and connector tube.

A second embodiment of a connector of a co-tube assembly 50 is an end connector 52 located at one end of a co-tube 54 for separating the co-tube 54 to two separate tubes. FIGS. 4–6 illustrate the end connector 52 in accordance to the second embodiment.

The end connector 52 in accordance to the second embodiment is hollow and defines an axial bore 60 extending axially inwardly from a first opening 62. Axially inwardly from the first opening 62 is a first cylindrical surface 64 terminating at a radially reduced portion 66. The diameter of the first cylindrical surface 64 is slightly larger than the outer diameter of the outer tube 58 of the co-tube 54 such that upon the outer tube 58 inserted into the first cylindrical surface 64, the outer tube 58 fits snugly within first cylindrical surface 64 of the end connector 52. The diameter of the radially reduced portion 66 is significantly smaller than the outer diameter of the outer tube 58 of the co-tube 54 such that the radially reduced portion 66 acts as a limit surface preventing the outer tube 58 from being inserted axially inwardly beyond the radially reduced portion 66.

Axially inwardly from the radially reduced portion 66 is a conical surface 68 expanding to a second cylindrical surface 70. The second cylindrical surface 70 terminates at a radial face 72. The radial face 72 has a second opening 74 off-set toward one end of the radial face 72 and a third opening 76 off-set toward the other end of the radial face 72. The diameter of the second opening 74 is slightly larger than the outer diameter of the inner tube 56 of the co-tube 54 thus allowing the inner tube 56 to extend continuously through the second opening 74 of the end connector 52 and fit snugly within the second opening 74. The diameter of the third opening 76 is slightly larger than the outer diameter of a connector tube 78 for carrying the second fluid. A chamber 80 is defined by the second cylindrical surface 70, the conical surface 68 and the radial face 72.

The co-tube assembly 50 with the end connector 52 in accordance to the second embodiment is assembled as follow. One end of the outer tube 58 is inserted into the first opening 62 of the end connector 52 until the terminal end of the outer tube 58 abuts the radially reduced portion 66. The inner tube 56 has a first bend 82 at a given angle ω axially inwardly of the terminal end of the outer tube 58. A second bend 84 at the given angle ω is formed at a given length from the first bend 82 such that the inner tube section 56a axially outwardly of the first bend 82 is parallel and off-set with the inner tube section 56b axially inwardly of the second bend 84. The inner tube section 56b axially inwardly of the second bend 84 extends through the second opening 74 of the end connector 52 to form the separated portion carrying the liquid refrigerant. The connector tube 78 is inserted into the third opening 76. The connector tube 78 forms the other end of the fluid line for carrying the gas refrigerant.

The co-tube assembly 50 with the end connector 52 in accordance to the second embodiment functions as follows. The inner tube 56 carries gas refrigerant in a first direction. Since the inner tube 56 is continuous, including the section radially inwardly of the end connector 52, the end connector 52 does not disturb the flow of the liquid refrigerant carried within the inner tube 56. One end of the fluid line carrying the liquid refrigerant is the space defined between the inner tube 56 and the outer tube 58. The other end of the fluid line carrying the liquid refrigerant is the connector tube 78. The gas refrigerant may flow from the space defined between the inner tube 56 and outer tube 58 toward the connector tube 78. For such a flow direction, the gas refrigerant flows from the space defined between the inner tube 56 and outer tube 58 and is discharged into the chamber 80 defined by the conical surface 68, the second cylindrical surface 70 and the radial face 72. The gas refrigerant then flows from the chamber 80 into the connector tube 78. Alternatively, the gas refrigerant may flow from the connector tube 78 toward the space defined between the inner tube 56 and outer tube 58. For such a flow direction, the gas refrigerant flows from the connector tube 78 into the chamber 80. The gas refrigerant then flows from the chamber 80 into the space defined between the inner tube 56 and outer tube 58.

A third embodiment of a connector of a co-tube assembly is an end connector located at one end of a co-tube for separating the co-tube to two separate opening. The end connector in accordance to the third embodiment can be mounted directly to a component of an air condition system having a first opening defining a gas refrigerant path, a second opening defining a liquid refrigerant path and a thread bore for securing a bolt for retaining the end connector to the component of the air condition system. FIGS. 7–10 illustrate the end connector 100 in accordance to the third embodiment.

The end connector 100 in accordance to the third embodiment has a generally rectangular shaped connector body 106. A semi-cylindrical surface 108 extends from the top of the connector body 106 at one end of the connector body 106. Located radially inwardly from the semi-cylindrical surface 108 is a first bore 110 extending through the connector 100 from a chamfered first opening 112. The first opening 112 is chamfer to facilitate the insertion of the outer tube 104 of the co-tube into the first bore 110. Axially inwardly of the chamfered first opening 112 is a first cylindrical surface 114 terminating at an annular surface 116. The diameter of the first cylindrical surface 114 is slightly larger than the outer diameter of the outer tube 104. This allows the outer tube 104 to be inserted into the first bore 110 without excessive radially movement.

Radially inwardly and axially inwardly of the annular surface is a second cylindrical surface 118. The diameter of the second cylindrical surface 118 is smaller than the outer diameter of the outer tube 104 and approximately the same as the inner diameter of the outer tube 104. Such an arrangement allows the annular surface 116 to act as a limit surface preventing the outer tube 104 from being further inserted axially inwardly in the first bore 110.

Axially inwardly of the second cylindrical surface 118 is a conical surface 120 leading to a third cylindrical surface 122. The third cylindrical surface 122 terminates at a chamfered second opening 124. The second opening 124 is chamfered to facilitate the insertion of the inner tube 102 of the co-tube into the first bore 110. The diameter of the third cylindrical surface 122 is slightly larger than the outer diameter of the inner tube 102. This allows the inner tube 102 to be inserted into the space defined by third cylindrical surface 122 without excessive radial movement.

A first protrusion 126 is formed on the underside of the connector body 106. The first protrusion 126 is perpendicular to the first bore 110. The distal end 128 of the first protrusion 126 defines an opening 132 to a second bore 130 extending perpendicular to the first bore 110 and intersecting the second cylindrical surface 118 of the first bore 110. The diameter of the second bore 130 is smaller than the diameter of the second cylindrical surface 118 of the first bore 110. The center-line of the second bore 130 is offset-at a given distance from the center-line of the first bore 110 such that one edge of the surface defining the second bore 130 is in-line with the second cylindrical surface 118 of the first bore 110.

The connector 100 has a third bore 134 parallel with the first bore 110 and located t the other end of the connector 100 from the first bore 110. The third bore 134 extends inwardly from a chamfered opening 136. The chamfered opening 136 of the third bore 134 is located at the same surface of the connector body 106 as the chamfered second opening 124 of the first bore 110. The opening 136 of the third bore is chamfered to facilitate the insertion of the inner tube 102 of the co-tube into the third bore 134. Axially inwardly of the chamfered opening 136 is a first cylindrical surface 138 terminating at an annular surface 140. The diameter of the first cylindrical surface 138 is slightly larger than the outer diameter of the inner tube 102. This allows the inner tube 102 to be inserted into the third bore 134 without excessive radially movement.

Radially inwardly and axially inwardly of the annular surface 140 is a second cylindrical surface 142. The diameter of the second cylindrical surface 142 is smaller than the outer diameter of the inner tube 102 and approximately the same as the inner diameter of the inner diameter of the inner tube 102. Such an arrangement allows the annular surface 140 to act a limit surface preventing the inner tube 102 from being further inserted axially inwardly into the third bore 134.

A second protrusion 144 is formed on the underside of the connector body 106. The second protrusion 144 is perpendicular to the third bore 134 and parallel with the first protrusion 126. The distal end 146 of the second protrusion 144 defines an opening 150 to a fourth bore 148 extending perpendicular to the third bore 134. The fourth bore 148 extends into the connector 100 until it intersects the third bore 134, thus creating a fluid path extending from the opening 136 of the third bore 134 to the opening 150 of the fourth bore 148. Therefore, the third bore 134 and the fourth bore 148 need only extend far enough into the connector 100 to intersect each other for forming the fluid path.

The connector body 106 has fifth bore 152 extending through the connector 100. The fifth bore 152 is located between and parallel with the second bore 130 and the fourth bore 148 of the connector 100, and is therefore located between and parallel with the first protrusion 126 and the second protrusion 144. The fifth bore 152 is sized slightly larger than a bolt 154 to be inserted through the fifth bore 152.

Figure 7:
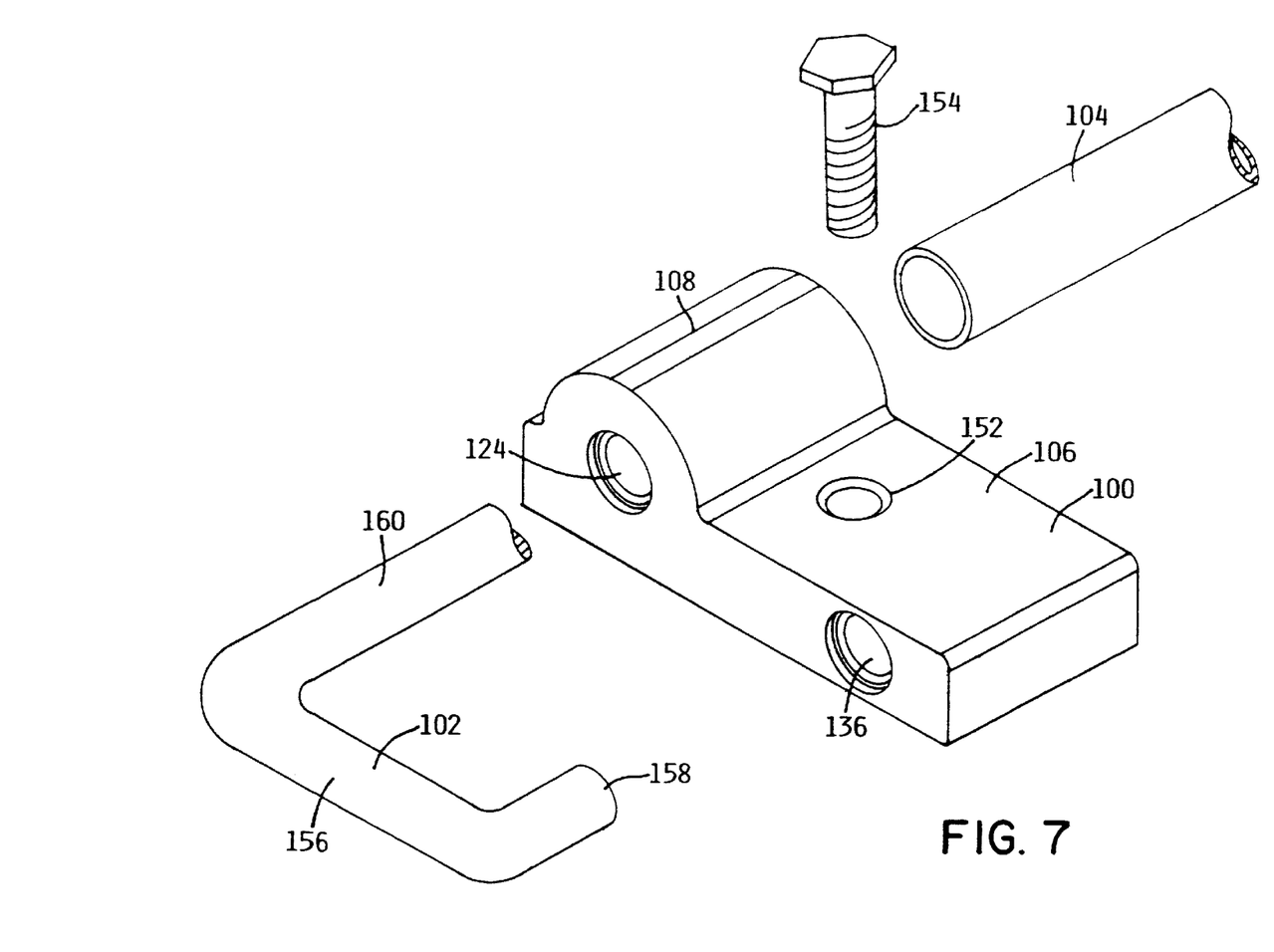
FIG. 7 is a perspective view of a third embodiment of a connector.
Figure 8:
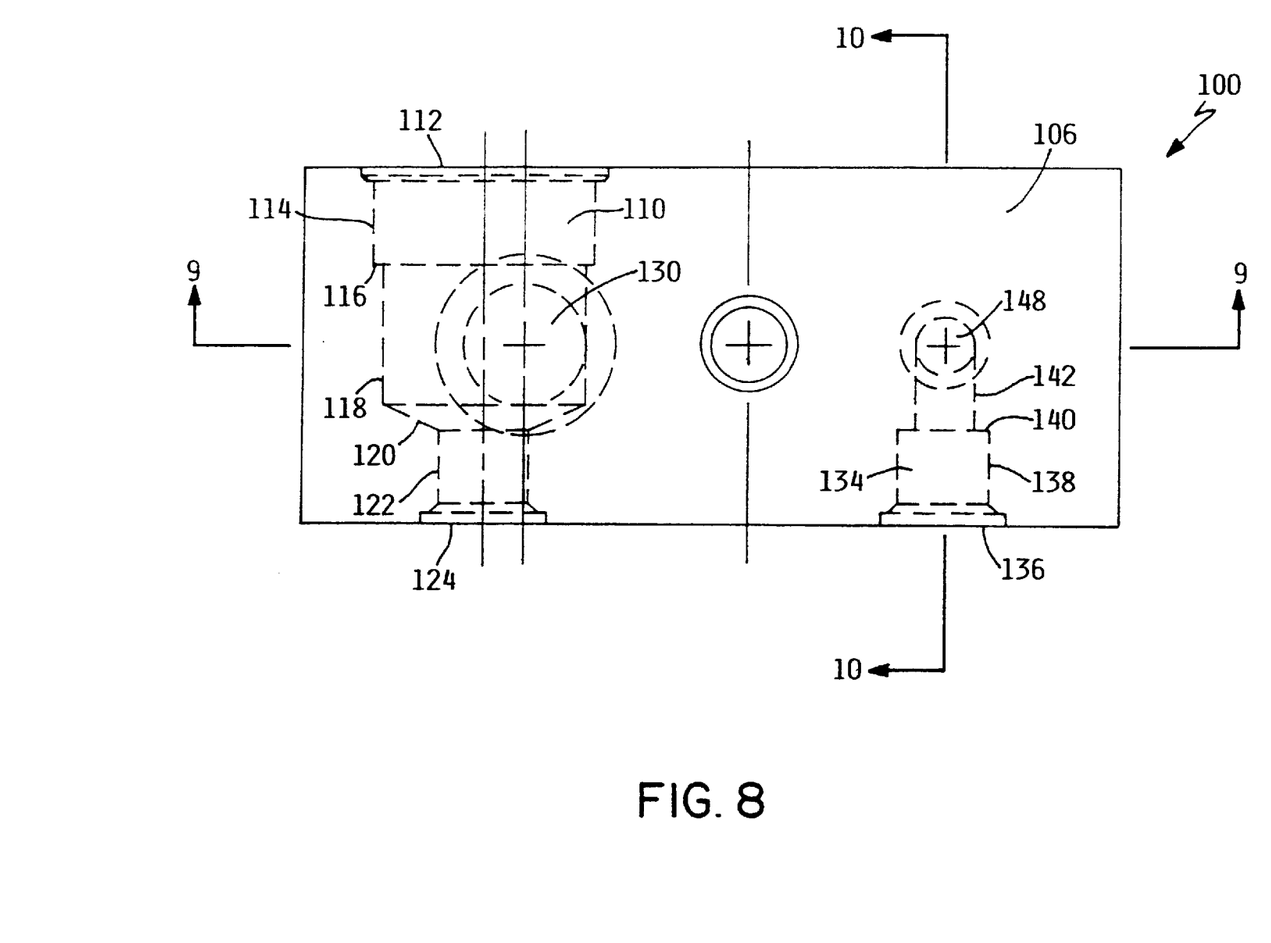
FIG. 8 is a top view of the connector of FIG. 7.
Figure 9:
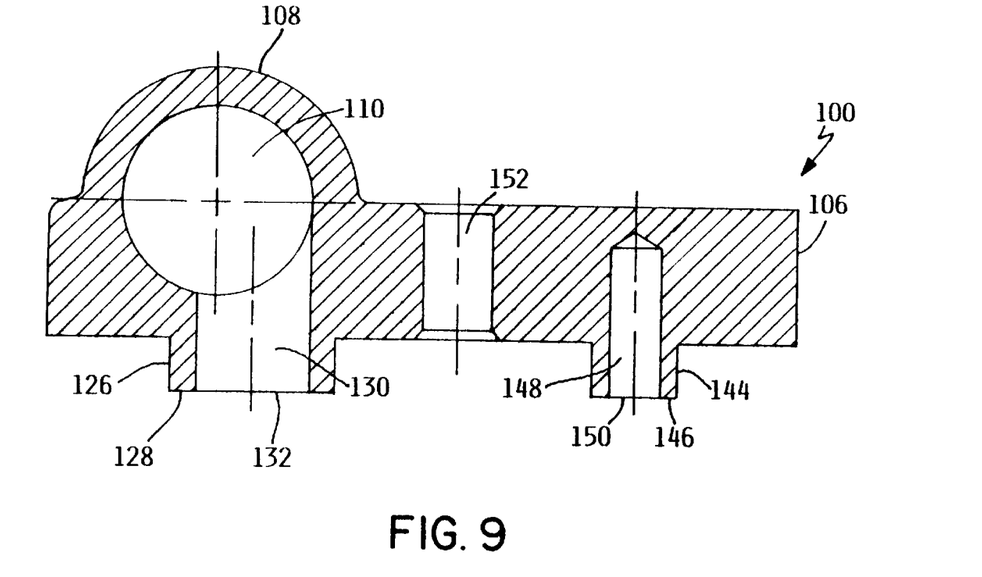
FIG. 9 is a sectional view of the connector of FIG. 8 as taken along line 9-9.
Figure 10:
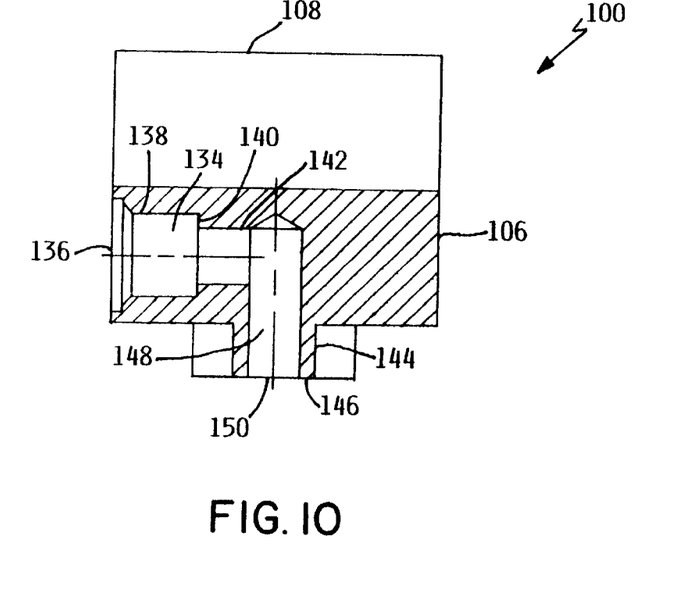
FIG. 10 is a sectional view of the connector of FIG. 8 as taken along line 10-10.

The connector 100 in accordance to the third embodiment is assembled as follows and as illustrated in FIG. 7. A U-shaped end 156 is formed at one end of the inner tube 102. The distance between the distal end 158 of the U-shaped end 156 and the straight it portion 160 of the inner tube 102 is approximately the same as the distance between the second opening 124 of the first bore 110 and the opening 136 of the third bore 134. The A, straight portion 160 of the inner tube 102 is inserted into second opening 124 of the first bore 110 and through the first bore 110. The distal end 158 of the U-Shaped end 156 is inserted into the opening 136 of the third bore 134 until the distal end 158 abuts the annular surface 140 of the third bore 134. The outer tube 104 is then slid over the inner tube 102 and inserted into a first opening 112 of the first bore 110 until the terminal end of the outer tube 104 abuts the annular surface 116 of the first bore 110.

The connector 100 is then mounted to a component of an air condition system (not shown). The air condition component can be an evaporator or a compressor. The first protrusion 126 is inserted into the opening of the air condition component defining the gas refrigerant path and the second protrusion 144 is inserted into the opening of the air condition component defining the liquid refrigerant path. Thereafter, the connector 100 is retained to the air condition component by inserting the bolt 154 through the fifth bore 152 of the connector 100 and securing the bolt 154 to a threaded bore of the air condition component.

Various features of the present invention have been described with reference to the above embodiments. It should be understood that modification may be made without departing from the spirit and scope of the invention as represented by the following claims.

What is claimed is:

1. A co-tube assembly for a heating and air conditioning system comprising:
    a connector defining a first opening at a first terminal end of said connector, said connector further defining a second opening and a third opening at a second terminal end of said connector;
    a first tube extending through said first opening of said connector and said second opening of said connector, said first tube having a first portion axially outwardly of said first opening and a second portion axially outwardly of said second opening, said first portion of said first tube is approximately parallel with said second portion of said first tube; and
    a second tube disposed over said first portion of said first tube and inserted into said first opening of said connector.

2. The co-tube assembly as claimed in claim 1 wherein said first opening is directed toward a first direction, said second opening is directed toward a second direction and said third opening is directed toward said second direction, wherein said first direction is not the same as said second direction.

3. The co-tube assembly as claimed in claim 2 wherein said first direction is approximately 180 degrees from said second direction.

4. The co-tube assembly as claimed in claim 1 wherein said first portion of said inner tube is offset at a given distance from the second portion of said inner tube.

5. The co-tube assembly as claimed in claim 1 wherein said connector has a radial face at the second terminal end of the connector, said radial face defines said second opening and said third opening.

6. The co-tube assembly as claimed in claim 1 wherein said first tube is formed of a flexible material.

7. The co-tube assembly as claimed in claim 1 wherein said first tube is adapted for carrying a first fluid, said space defined between said first tube and said second tube is adapted for carrying a second fluid.

8. The co-tube assembly as claimed in claim 1 wherein said first tube is adapted for carrying a first fluid flowing in a first direction, said space defined between said first tube and said second tube is adapted for carrying a second fluid flowing in a second direction.

9. The co-tube assembly as claimed in claim 1 wherein said first tube is adapted for carrying a fluid flowing in a first direction, said space defined between said first tube and said second tube is adapted for carrying said fluid in an opposite direction.

10. The co-tube assembly as claimed in claim 1 further comprising a third tube extending through said third opening.

11. The co-tube assembly as claimed in claim 10 wherein said second portion of said first tube is approximately parallel with said third tube.

12. A co-tube assembly for a heating and air conditioning system comprising:
    a connector having a first surface defining a first opening, a second surface defining a second opening and a third opening, and a third surface defining a fourth opening and a fifth opening;
    said connector further having a first bore extending from said first opening to said second opening, a second bore extending from said third opening, a third bore extending from said fourth opening, and a fourth bore extending from said fifth opening;

a first tube extending into said first bore and into said second bore;

a second tube extending into said first bore of said connector, said second tube disposed over a portion of said first tube; and wherein said third bore of said connector intersects said first bore of said connector, and said four bore of said connector intersects said second bore of said connector.

13. The co-tube assembly as claimed in claim 12 wherein said first tube, said second bore and said fourth bore are adapted for carrying a first fluid, said third bore and said space defined between said first tube and said second tube are adapted for carrying a second fluid.

14. The co-tube assembly as claimed in claim 12 wherein said first bore is approximately ninety degrees from said third bore.

15. The co-tube assembly as claimed in claim 14 wherein said second bore is approximately ninety degrees. from said fourth bore.

16. The co-tube assembly as claimed in claim 14 wherein said fourth bore is approximately parallel with said third bore.

17. The co-tube assembly as claimed in claim 12 wherein said connector further having a first protrusion and a second protrusion extending from said third surface, said third bore extending through said first protrusion, said fourth bore extending through said second protrusion.

18. The co-tube assembly as claimed in claim 12 wherein said first tube has a U-shaped end, the distal end of the U-shaped end extends into said second bore.

* * * * *